(12) United States Patent
Negri et al.

(10) Patent No.: US 10,781,714 B2
(45) Date of Patent: Sep. 22, 2020

(54) DEVICE FOR LIMITING OVERSPEEDING OF A TURBINE SHAFT OF A TURBOMACHINE, AND ASSOCIATED CONTROL METHOD

(71) Applicant: SAFRAN AIRCRAFT ENGINES, Paris (FR)

(72) Inventors: Arnaud Nicolas Negri, Moissy-Cramayel (FR); Nils Edouard Romain Bordoni, Moissy-Cramayel (FR); Michel Gilbert Roland Brault, Moissy-Cramayel (FR); Romain Guillaume Cuvillier, Moissy-Cramayel (FR); Guillaume Patrice Kubiak, Moissy-Cramayel (FR); Nathalie Nowakowski, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 13 days.

(21) Appl. No.: 16/088,784

(22) PCT Filed: Mar. 29, 2017

(86) PCT No.: PCT/FR2017/050712
§ 371 (c)(1),
(2) Date: Sep. 26, 2018

(87) PCT Pub. No.: WO2017/168090
PCT Pub. Date: Oct. 5, 2017

(65) Prior Publication Data
US 2019/0277156 A1    Sep. 12, 2019

(30) Foreign Application Priority Data
Mar. 31, 2016  (FR) ..................... 16 52849

(51) Int. Cl.
*F01D 21/02* (2006.01)
*F01D 21/04* (2006.01)

(52) U.S. Cl.
CPC ........... *F01D 21/02* (2013.01); *F01D 21/045* (2013.01); *F05B 2270/1011* (2013.01); *F05D 2270/021* (2013.01); *Y02T 50/671* (2013.01)

(58) Field of Classification Search
CPC ........ F01D 21/02; F01D 21/045; F01D 21/04; F01D 21/006; F01D 25/24; Y02T 50/671; F05D 2270/021; F05B 2270/1011
(Continued)

(56) References Cited

U.S. PATENT DOCUMENTS 3,490,748 A * 1/1970 Hoffman ............... F01D 21/006
                                                           415/9
4,503,667 A * 3/1985 Roberts ................. F01D 21/045
                                                           415/9
(Continued)

FOREIGN PATENT DOCUMENTS

FR    2907840 A1    5/2008
GB    2128685 A  *  5/1984 ........... F01D 21/006

OTHER PUBLICATIONS

Written Opinion of the International Searching Authority dated Jun. 30, 2017, issued in corresponding International Application No. PCT/FR2017/050712, filed Mar. 29, 2017, 6 pages.
(Continued)

*Primary Examiner* — J. Todd Newton
(74) *Attorney, Agent, or Firm* — Christensen O'Connor Johnson Kindness PLLC

(57) ABSTRACT

Embodiments of the disclosure relate to a device for limiting overspeeding of a turbine shaft of a turbomachine, comprising structure for destroying the rotor blades of at least one turbine stage. The structure includes a casing and at least one
(Continued)

projectile configured for projecting into the path of the rotor blades of the stage in order for the stage in question to be destroyed.

17 Claims, 4 Drawing Sheets

(58) Field of Classification Search
USPC .......................................................... 415/1, 9
See application file for complete search history.

(56) References Cited

U.S. PATENT DOCUMENTS

| | | | | |
|---|---|---|---|---|
| 4,505,104 A * | 3/1985 | Simmons | .............. | F01D 21/045 |
| | | | | 415/9 |
| 5,752,383 A * | 5/1998 | Rominek | .............. | F01D 21/006 |
| | | | | 415/19 |
| 7,484,924 B2 * | 2/2009 | Soupizon | ................ | F01D 21/02 |
| | | | | 415/9 |
| 8,057,160 B2 * | 11/2011 | Bart | ...................... | F01D 21/006 |
| | | | | 415/9 |
| 8,127,525 B2 * | 3/2012 | Bart | ...................... | F01D 21/006 |
| | | | | 415/9 |
| 2006/0251506 A1 * | 11/2006 | Soupizon | ................ | F01D 21/02 |
| | | | | 415/9 |
| 2006/0263220 A1 * | 11/2006 | Russ | ..................... | B64C 11/303 |
| | | | | 416/147 |
| 2008/0101917 A1 | 5/2008 | Bart et al. | | |
| 2008/0289315 A1 * | 11/2008 | Bart | ...................... | F01D 21/006 |
| | | | | 60/39.091 |
| 2009/0126336 A1 * | 5/2009 | Bart | ...................... | F01D 21/006 |
| | | | | 60/39.091 |
| 2016/0090187 A1 * | 3/2016 | Certain | .................... | F02C 9/28 |
| | | | | 60/773 |
| 2016/0090918 A1 * | 3/2016 | Certain | ................. | F01D 21/003 |
| | | | | 415/1 |
| 2017/0314411 A1 * | 11/2017 | Roberge | ................ | F16D 63/002 |

OTHER PUBLICATIONS

International Preliminary Report on Patentability dated Oct. 2, 2018, issued in corresponding International Application No. PCT/FR2017/050712, filed Mar. 29, 2017, 1 page.

International Search Report dated Jun. 30, 2017, issued in corresponding International Application No. PCT/FR2017/050712, filed Mar. 29, 2017, 2 pages.

* cited by examiner

DEVICE FOR LIMITING OVERSPEEDING OF A TURBINE SHAFT OF A TURBOMACHINE, AND ASSOCIATED CONTROL METHOD

FIELD OF THE DISCLOSURE

Embodiments of the present disclosure relate to a device for limiting overspeeding of a turbine rotor of an aircraft turbomachine, such as for example, a turbofan.

BACKGROUND

The event of overspeeding a turbine rotor is, in principle, a rare event.

For example, in the case of a turbofan, which conventionally comprises a low-pressure rotor coupled with a fan of the turbofan, and wherein the coupling is done by way of two shafts and a reduction gear mounted in series, such an event can occur when the turbine shaft which connects the rotor to the reduction gear breaks, or when an internal member of the reduction gear breaks, or when the shaft which connects the reduction gear to the fan breaks.

Upon the breaking of one of these shafts or the internal member of the reduction gear, the rotor of the turbine is consequently mechanically uncoupled from the fan, which thus no longer exerts resistant torque on this shaft and which consequently no longer limits the rotation speed thereof. However, the rotor blades of the turbine continue to be driven in rotation by the gases exiting the combustion chamber of the turbomachine. The turbine thus overspeeds, which subjects the turbine rotor to excessive centrifugal forces which are likely to cause the breaking thereof, with the consequence of risks of perforating the external casing of the turbine and also the cabin of the aeroplane which is equipped with this turbomachine. The limiting of overspeeding is therefore an imperative limitation to be followed in turbomachines.

The axial position of the shaft of the turbine rotor is in particular determined by a thrust bearing and by the coupling thereof to the reduction gear. Devices known to limit overspeeding generally utilize the fact that the breaking of the turbine shaft enables a movement towards the bottom of the rotor of the turbine under the action of the pressure of the gases on the rotor blades. Devices for making the rotor of turbine mechanical braking have thus already been proposed, comprising means carried by the turbine rotor and intended to be supported on the corresponding means of a corresponding stator so as to brake the turbine rotor, following the movement thereof towards the bottom, after the breaking of the turbine shaft.

It has also been proposed to mount guide blades of the stator so that they can be removed, or tilted, such that the rotor, because of the movement thereof towards the bottom, after the breaking of the turbine shaft, is supported on these blades and makes them tilt over the path of the rotor blades to destroy them and thus slow down the rotation of the turbine.

A technical solution has finally been proposed, consisting of providing blades from stator distributors with a zone in the shape of axial deviation of the shape of the blade called "curved", enabling the turbine rotor, when it recoils during the breaking of the turbine shaft, to have the rotor blades thereof come into contact with the curved zone of the blades of the distributors in order to destroy the vanes of the rotor blades of the turbine, and thus slow down the rotation of the turbine. This destruction operation is, for this reason, known as "feathering" the turbine.

This solution has the disadvantage of not enabling a maximum optimization of the stator blades, because of the presence of the curved zones on these blades. Moreover, this solution only enables the turbine to stop in case of axial movement of the turbine shaft occurring in case of this shaft breaking, but not in the case of the fan shaft breaking or an internal member of the reduction gear breaking, as this type of breakage does not cause axial movement of the turbine shaft. Yet, this type of breakage is however dangerous as it is likely to cause an overspeeding of the turbine rotor.

In the specific case of a breaking of the shaft connecting the reduction gear to the fan, the overspeeding of the turbine shaft can also risk causing the reduction gear being destroyed, which finds itself driven at rotation speeds for which it is not designed.

Known solutions stated above are, in any case, relatively complex to implement. Moreover, these devices known for destroying blades are generally associated with devices for cutting off fuel supply from the combustion chamber, which are activated during the detection of overspeeding of the turbine rotor. Yet, these supply cutting devices do not themselves enable quickly slowing down the turbine rotor shaft, which is detrimental to the effectiveness thereof.

Thus, in case of overspeeding of the rotor of the turbine caused by the breaking of the fan shaft or by the breaking of an internal member of the reduction gear, in other words, in the absence of axial movement of the turbine rotor, the stopping or the slowing down of the rotor therefore only depends on the supply cutting device. This is particularly disadvantageous in the case of small engines, of which the weaker inertia of the turbine rotor induces a risk of quicker overspeeding, and for which breaking of the turbine discs can occur even before the cutting off of fuel supply has been able to sufficiently slow down the rotor.

Furthermore, the feathering devices based on the axial movement of the turbine rotor require a direct contact between the parts, and they can, because of this, prove to be inoperable in case of the rotor bouncing on a fixed part, or in case of this rotor orbiting. The braking devices based on friction between the parts have, themselves, an effectiveness that is difficult to predict, because they make multiple uncertain parameters occur, such as the temperature or the force exerted between the parts. Furthermore, certain known devices have the disadvantage of increasing the total mass of the turbine and of modifying the aerodynamic profile of the components thereof, at the expense of the performance of the engine when functioning normally.

To overcome this disadvantage, in document FR-A1.2.907.840, a device for limiting overspeeding of the turbine shaft has been proposed, comprising means for shearing the rotor blades of at least one stage of the turbine, these means comprising means for projecting a pin over the path of the rotor blades. These projection means comprise a pin associated with one single stage of blades of the turbine, which pin is mounted sliding between a retracted position wherein it is disposed immediately set back from the bypass wall of a casing of the turbine, and an extended position wherein it protrudes in the bypass outside of the turbine casing, while being held by this casing in order to cause the breaking of the vanes of the associated turbine stage.

Such a device therefore remains having a limited effectiveness, as the pin remains rigidly connected to the casing and is therefore only able to directly destroy the blades of the turbine stage to which it is associated. At best, the stages situated downstream of the stage to which is associated the device, can only be destroyed by blade debris of which the mass and the dimension are not controlled, and of which the destructive action is consequently uncertain. Because of this, this device does not enable quickly slowing down the turbine.

Moreover, in this type of device, the sizing of the pin is itself subjected to numerous limitations.

In particular, the pin is all the larger than the distance which separates the bypass wall of the blades to be destroyed is larger. Consequently, in the retracted position thereof, the pin has a significant volume behind the bypass wall of the casing, which can pose problems with integrating the pin in the engine. The pin cannot, for example, be associated with the upstream stages of the turbine, because these stages would require a pin of an increased size, although this precisely by being specifically associated with these stages, that the pin would be the most effective, thereby producing the maximum blade debris capable of destroying successive stages of the turbine. The pin cannot any longer have an increased volume behind the bypass wall of the casing because such a volume would risk to be incompatible with other components of the engine.

The pin must also be all the more solid as it is long, in order to not be broken by shearing by the blades, the blades on the contrary needing to be destroyed by the pin.

SUMMARY

The disclosure, in particular has the aim of providing a simple, economic and effective solution to these problems, enabling to avoid the disadvantages of the known art. The disclosure, in particular aims to enable several stages of blades of the turbine to be destroyed, and preferably, all stages of the turbine.

With this aim, the disclosure provides a device for limiting overspeeding comprising a means for projecting a free projectile over the blades of at least one stage of the turbine blades.

The main advantage of this device is that it is not dependent on the rotor recoiling and can be triggered in the absence of the rotor recoiling. In addition, the speed with which the device slows down the rotor no longer depends on the response time of the projection means of the projectile. Moreover, the device enables projecting a free projectile through several successive stages, and, with the characteristics of the projectile being calculated, enables providing, with certainty, the destruction of all these stages.

To this end, the disclosure more specifically provides a device for limiting overspeeding of a turbine shaft of a turbomachine turbine, comprising destruction means capable of destroying the rotor blades of at least one stage of the turbine, the destruction means comprising projection means capable of projecting at least one projectile into the path of the rotor blades of the stage, these projection means being mounted on a casing of the turbomachine and controlled if the speed of said turbine exceeds a determined overspeeding threshold, wherein the projection means are mounted on the casing upstream of at least one stage of the turbine and is configured to release the at least one projectile and to project it in a free manner on the blade of the stage, in order to cause the destruction of the stage.

By "free", it will be understood that the projectile is projected by being exempt from any connection, in particular mechanical, with any part of the turbomachine, and that it is therefore free to move in the bypass of the turbomachine.

According to other characteristics of the device:
the projection means are mounted upstream of at least two stages of the turbine such that the at least one projectile and the blade debris of at least one upstream stage cause the destruction of at least one downstream stage,
the projection means comprise a housing of a casing of the turbomachine which delimits a section of the gas circulation bypass crossing the turbine, the housing further being sealed with respect to the remainder of the turbomachine, the projection means being configured to release and/or project the at least one free projectile in the bypass from the housing,
the housing leads to the bypass by way of an opening and the projection means comprise a controlled flap blocking the opening of the housing, the flap being mobile between a sealed closed position wherein it holds the at least one projectile in the housing, and an open position in response to the detection of an overspeeding of the turbine, wherein it enables the release of the at least one projectile in order to enable the driving thereof into the bypass at least by the gas flow, the projection means comprise a pyrotechnic, electrical or hydraulic means for opening the flap,
the projection means comprise a spring for assisting with and holding the opening of the flap,
the housing is coupled with a wall part of the casing and does not lead into the bypass, and the wall part is configured to be crossed by the at least one projectile as soon as it is propelled against the wall part at a determined speed,
the projection means comprise means for propelling the at least one projectile outside of the housing,
the projection means are configured to orient the at least one projectile along a direction, tangential to the first blade stage, this direction forming an angle of at most 90° with the axis of rotation of the turbine,
the at least one projectile comprises a wall part of the casing,
the casing is an inter-turbine casing interleaved between two consecutive casings of high-pressure, low-pressure and/or intermediate turbines of the turbomachine, and arranges upstream of all stages of the low-pressure turbine of the turbomachine,
the at least one projectile has characteristics of mass, dimension, hardness, and shape, which are capable of enabling a release of energy during the impact thereof with the blades, which is sufficient to cause the breaking of the blades.

The disclosure also relates to a control device for a device for limiting overspeeding of a turbine shaft of the type defined above, characterized in that it comprises at least:
a first step of monitoring the speed of the turbine of the turbomachine,
a second step of detecting overspeeding of the turbine occurring if the speed of the turbine exceeds a determined overspeeding threshold, and
a third projection step, occurring in response to the second detection step, during which the projection means cause the release and/or the projection of at least one free projectile in the bypass.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Figure 1:
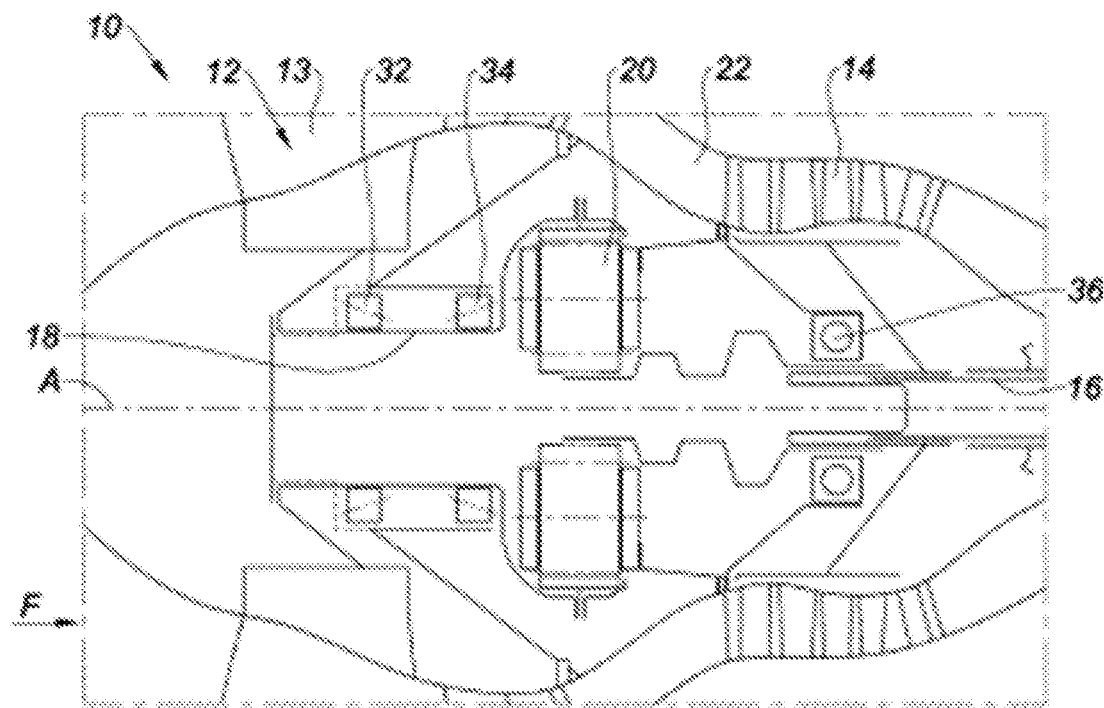
FIG. 1 is a schematic, cross-sectional, longitudinal view of an upstream part of a first type of turbomachine to which the disclosure is applied.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In FIGS. 3, 4, 7 and 8, an aircraft turbomachine 10 according to the disclosure has been shown, which here is a by-pass or two-spool turbofan.

The overall architecture of this turbomachine 10 is a conventional twin spool architecture, known from numerous turbomachines known from the state of the art. For this reason, following the present description, any reference to the general architecture of a turbomachine according to the state of the art will be made, by considering FIG. 3.

In the main, the turbomachine 10 comprises, from upstream to downstream along the flow direction of the gas flows F in the turbomachine, a fan 12, a low-pressure compressor 14, a high-pressure compressor 72, an annular combustion chamber 45, a high-pressure turbine 40 and a low-pressure turbine 44.

The rotor 72R of the high-pressure compressor 72 and the rotor 40R of the high-pressure turbine 40 are connected by a high-pressure (HP) shaft 42 and form with it a high-pressure body. The rotor 14R of the low-pressure compressor 14 and the rotor 44R of the low-pressure turbine 44 are connected by a low-pressure (LP) shaft 16 and form with it a low-pressure body.

Figure 2:
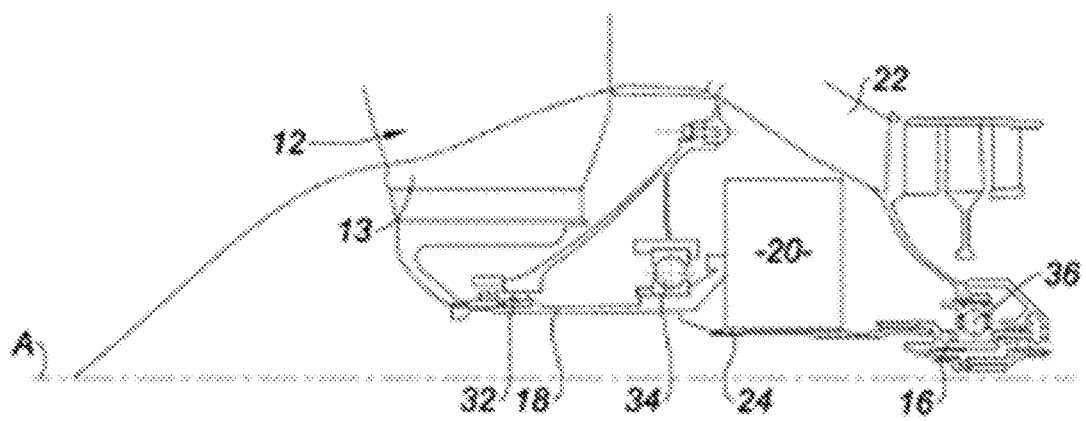
FIG. 2 is a schematic, cross-sectional, longitudinal view of an upstream part of a second type of turbomachine to which the disclosure is applied.

As illustrated by FIGS. 1 and 2, in the upstream part of the turbomachine 10, the fan 12 comprises vanes 13 which are connected to a fan shaft 18 which, in the example shown, is connected in rotation to the LP shaft 16 by way of a reduction gear 20, for example a planetary reduction gear, which has been shown here schematically. The fan 12 and the low-pressure compressor 14 thus form an upstream low-pressure module of the turbomachine.

In a known manner, the fan 12, and particularly when it is large, is driven at a rotation speed less than that of the LP shaft 16, in order to best adapt it aerodynamically.

The HP 42 and LP 16 shafts extend along a longitudinal axis A of the turbomachine 10.

The turbomachine 10 also comprises a fan casing (not shown) which extends around the vanes 12 and which defines a flow F air inlet bypass. Some of this air enters into an annular internal flow path 22 for a primary flow to flow through and the other air supplies an external annular flow path (not visible) for a secondary flow to flow through. The flow path 22 crosses the low-pressure 14 and high-pressure 72 compressors, the combustion chamber 45 and the high-pressure 40 and low-pressure 44 turbines. The external flow path surrounds the casings of the compressors and of the turbines, and joins the internal flow path 22 in a nozzle (not shown) of the turbomachine 10.

The shafts 16, 18 are centered and guided in rotation around the axis A by the bearings 32, 34, 36. In a first type of turbomachine which has been shown in FIG. 1, the fan shaft 18 is guided by two conical rolling bearings 32, 34, and, in a second type of turbomachine which has been shown in FIG. 2, the fan shaft 18 is guided by two bearings 32, 24, respective rolling and ball bearings.

Whatever the type of turbomachine, as illustrated by FIGS. 1 and 2, each shaft 16 is guided by at least one ball bearing 36 which forms an axial abutment which conditions the axial position of the corresponding functioning LP shaft 16.

In the case of the LP shaft 16 breaking, the recoiling of the low-pressure shaft 16 can be utilized to prevent the overspeeding risk. Indeed, in the case of such a breakage, the upstream part of the LP shaft 16 is no longer retained by the ball bearing 36 and is therefore free to recoil axially. Therefore, devices enabling utilizing this recoiling to slow down the LP shaft 16 have been proposed.

Figure 3:
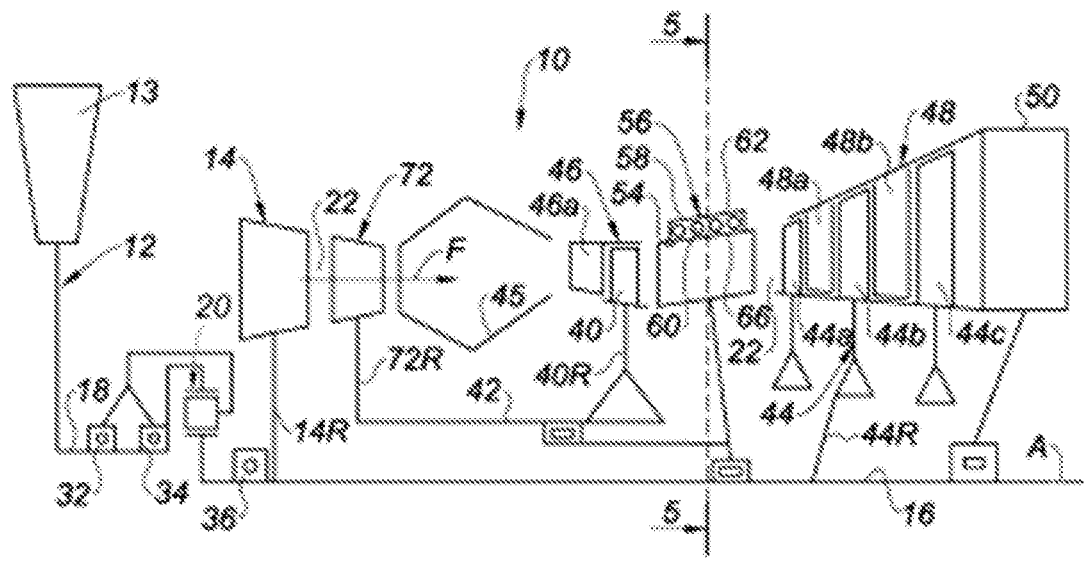
FIG. 3 is a very schematic, cross-sectional, longitudinal half-view of a turbomachine according to the disclosure, equipped with a device for limiting overspeeding according to a first embodiment of the disclosure shown in an inactive mode.

Devices for mechanically breaking the LP shaft 16 have thus been proposed, in a similar turbomachine configuration to that of the turbomachine in FIG. 3, comprising means (not shown) carried by the rotor 44R associated with the LP shaft 16 and intended to be supported on the corresponding means of a stator of the turbomachine so as to make the LP shaft 16 slow down, following the movement thereof downstream, after the breaking of the turbine shaft.

Devices enabling destroying the low-pressure turbine blades 44 have also been proposed, according to the technique called "feathering" of the LP turbine 44. Blocking (not shown) or "curved" means, consisting of specific zones of blades for guiding the stators between two turbine stages, corresponding to the shapes of the axially deviated blades, are provided to be arranged over the path of the rotor blades in case of recoiling of the LP shaft 16 and to come into contact with the rotor blades of the low-pressure rotor to destroy the blades and thus slow down the rotation of the turbine. The LP shaft 16 is thus no longer driven by high-energy gases coming from the combustion chamber, therefore not risking overspeeding.

However, there is currently no effective solution to prevent an overspeeding of the LP shaft 16 in case of breaking of the fan shaft 18 or in case of breaking of an internal member of the reduction gear 20.

Indeed, in this case, the LP shaft 16 is still retained axially by the ball bearing 36 thereof, such that it is not able to recoil, and the abovementioned braking or "feathering" technologies are ineffective.

Such an overspeeding can cause breaking of one or more stages of the LP turbine 44. Indeed, the LP turbines comprise, in a known manner, for each stage, blades rigidly connected to turbine discs. These discs are provided to radially retain the blades, are subjected to very intense centrifugal forces and are sized to resist them up to a certain speed, beyond which they risk breaking. The breaking of a disc is likely to cause high-energy debris from discs and blades to be sent mainly in a radial direction, this debris thus being able to cross the casings of the turbomachine, or even the wings or the cabin of the aircraft to which the turbomachine 10 belongs, with increased consequences for the safety thereof.

Such an overspeeding could further be damaging to the reduction gear 20, which is not sized to support the overspeeding provisions of the LP shaft 16.

The solution proposed by the disclosure will now be disclosed. As can be seen in FIGS. 3, 4, 7 and 9, the low-pressure turbine 44 of the turbomachine 10 of the disclosure comprises a plurality of stages of the LP turbine 44. In FIGS. 3, 4, 7 and 8, a LP turbine 44 has been shown, comprising three stages of vanes 44a, 44b, 44c, but it will be understood that this provision is not limiting of the disclosure.

The HP 40 and LP 44 turbines are each housed in a HP turbine casing 46 and a corresponding LP turbine casing 48, which carry the fixed stages of corresponding distributors 46a and 48a, 48b interleaved between the stages of rotor blades 40, 44a, 44b, 44c. Downstream of the LP turbine casing 48, an exhaust casing 50 enables the evacuation of gases having crossed the turbomachine 10, in other words, having circulated in the primary flow path 22 of the turbomachine 10. An inter-turbine casing 54 is disposed between the HP 42 and LP 44 turbines, and more specifically between the HP turbine casing 46 and the LP turbine casing 48.

The turbomachine 10 which has been shown in FIGS. 3, 4, 7 and 9 is a twin spool turbomachine, but it will be understood that the disclosure which will now be defined, also finds the application thereof in a multi-spool turbomachine, for example a turbomachine with three spools comprising an additional intermediate spool, and comprising because of this, an additional turbine and an additional associated turbine casing.

According to the disclosure, the turbomachine 10 comprises a device for limiting overspeeding of the LP shaft 16 of a turbomachine turbine, comprising destruction means 56 for destroying the rotor blades of at least one stage of the LP turbine 44.

These destruction means 56 comprise projection means 58, which are mounted on a casing of the turbomachine and which are controlled by detecting means that are capable of detecting an excessive rotational speed of the turbine, i.e. that are capable of detecting an overspeeding of the turbine occurring if the speed of said turbine exceeds a determined overspeeding threshold.

In the preferred embodiment of the disclosure, as it will be seen following the present description, the destruction means 56 are provided to ensure the destruction of the rotor blades of all the stages 44a, 44b, 44c of the LP turbine 44.

The destruction means 56 more specifically comprise projection means 58 that are capable of projecting at least one projectile 60 into the path of the rotor blades of a stage 44a of the LP turbine 44, and they are mounted on this casing upstream of at least one stage of the LP turbine 44. Following the present description, the projection means 58 are defined as able of projecting several projectiles 60, but it will be understood that this configuration does not limit of the disclosure, and that they could only project one single projectile.

The projection means 58 are configured to release the projectiles 60 and to project them freely over the blades of the stage 44a in order to cause the destruction of the stage 44a.

Figure 4:
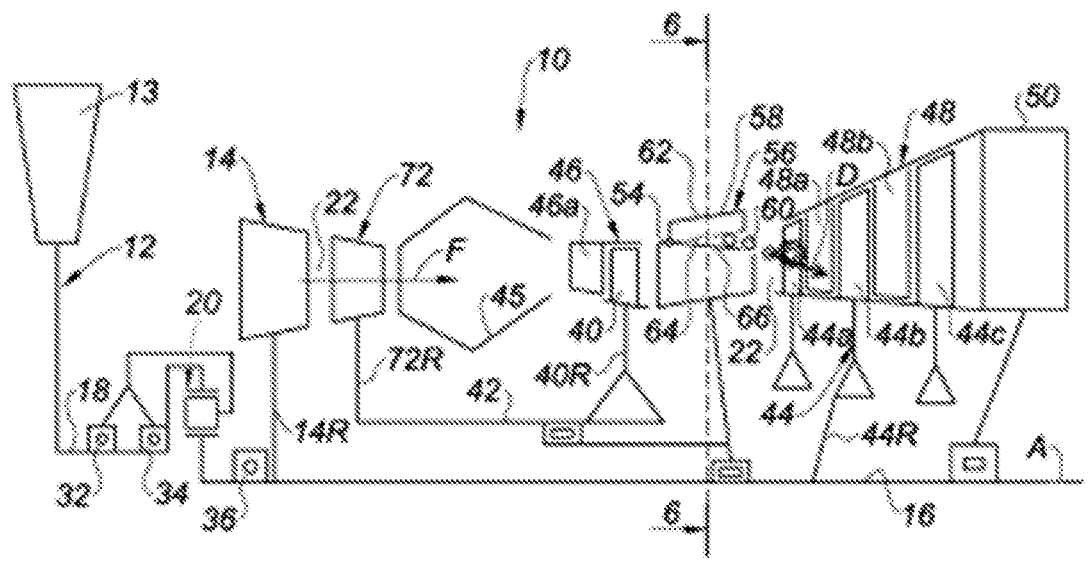
FIG. 4 is a very schematic, cross-sectional, longitudinal half-view of a turbomachine according to the disclosure, equipped with a device for limiting overspeeding according to the first embodiment of the disclosure shown in an active mode.
Figure 8:
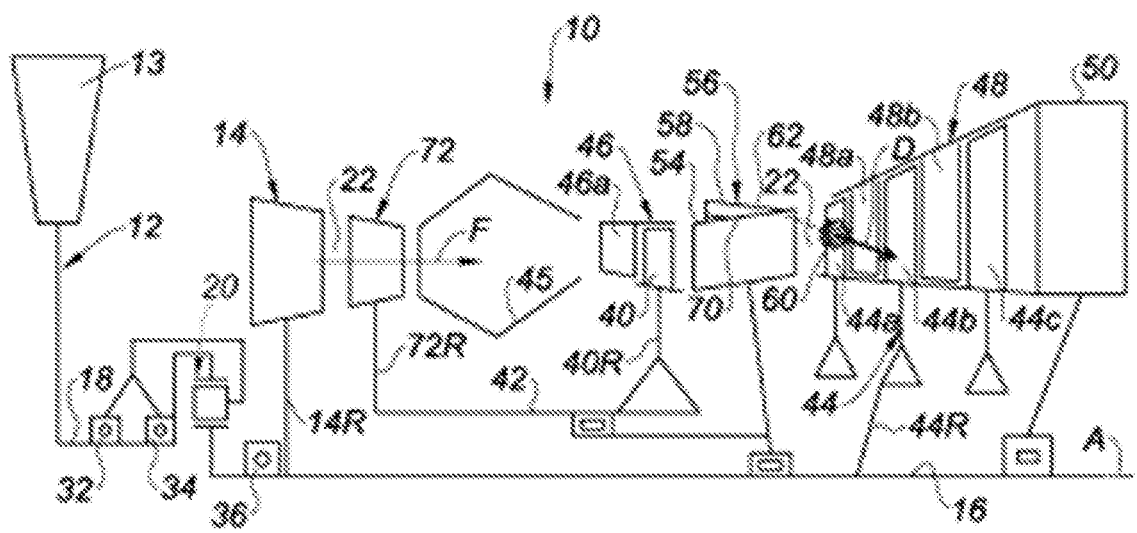
FIG. 8 is a very schematic, cross-sectional, longitudinal half-view of a turbomachine according to the disclosure, equipped with a device for limiting overspeeding according to a second embodiment of the disclosure shown in an active mode.

In the preferred embodiment of the disclosure, the projection means 58 are mounted upstream of at least two stages 44a, 44b of the LP turbine 44, such that the free projectiles 60 and the blade debris of at least one upstream stage 44a cause the destruction of at least one downstream stage 44b, as shown in FIGS. 4 and 8.

In the example of an embodiment which has been shown in FIGS. 3, 4, 7 and 8, the projection means 58 are provided to project the free projectiles 60 into the path of the rotor blades of the first stage 44a of the LP turbine such that the projectiles 60 successively destroy the blades of all the stages 44a, 44b and 44c. With respect to the prior art, this configuration guarantees that the projectiles 60 cross all the stages 44a, 44b, 44c while destroying them.

Thus, the destruction of the stages 44b, 44c following the stage 44a is not done only by the blade debris of the upstream stages, but what is more, by the projectiles 60, which guarantees the optimal destruction thereof.

To enable an optimal destruction of the stages 44a, 44b, 44c of the LP turbine 44, the projection means 58 are mounted on an upstream casing of the stage 44a of the LP turbine 44, in other words, on the inter-turbine casing 54 which is arranged between the low-pressure turbine casing 48 and the high-pressure turbine casing 46. It will be understood that if a lesser number of stages are desired to be destroyed, the projection means could be mounted on the LP turbine casing 48 upstream of the stages to be destroyed along the flow direction.

In all embodiments of the disclosure which will be defined below, the projection means 58 comprise a housing 62 which is carried by the interturbine casing 54 of the turbomachine and which delimits, in this regard, a section of the gas circulation bypass 22 crossing the turbine. The housing 62 is sealed with respect to the remainder of the turbomachine 10, in order to avoid hot gases being able to enter into the parts of the turbomachine situated outside of the flow path 22. The projectiles 60 are stored in the housing 62 and the projection means 58 are configured to release and/or to project the free projectiles 60 in the flow path 22 from the housing 62.

According to a first embodiment of the disclosure which has been shown in FIGS. 3 and 4, the housing 62 leads to flow path 22 by way of an opening 64, which has been shown as a dotted line in FIG. 4. The projection means 58 comprise a controlled flap 66 which blocks the opening 64 of the housing 62. This flap 66 is mobile between a sealed closed position, associated with an inactive mode of the device limiting overspeeding shown in FIG. 3, wherein it holds the projectiles 60 in the housing 62, and an open position associated with an active mode of the device limiting overspeeding in response to the detection of an overspeeding of the turbine, wherein it enables, as shown in FIG. 4, the release of the projectiles 60 in order to enable the driving thereof into the flowpath 22 at least by the gas flow.

It will be noted, that the flap 66, when it is closed, blocks the housing 62 in a sealed manner, such that the hot gases are not infiltrated in the housing 62. This sealing can be done in different ways, for example by means of a seal (not shown) which borders the flap 66 and which is intended to be torn by the flap 66 during the opening thereof, or by metal sealing strips (not shown).

The opening of the flap 66 can be controlled in different ways. To this end, the projection means 58 can comprise a pyrotechnic, electrical or hydraulic means for opening the flap 66. For example, pyrotechnic means can consist of an explosive charge or possibly sodium acid pellets or another material that generates gas.

Figure 5:
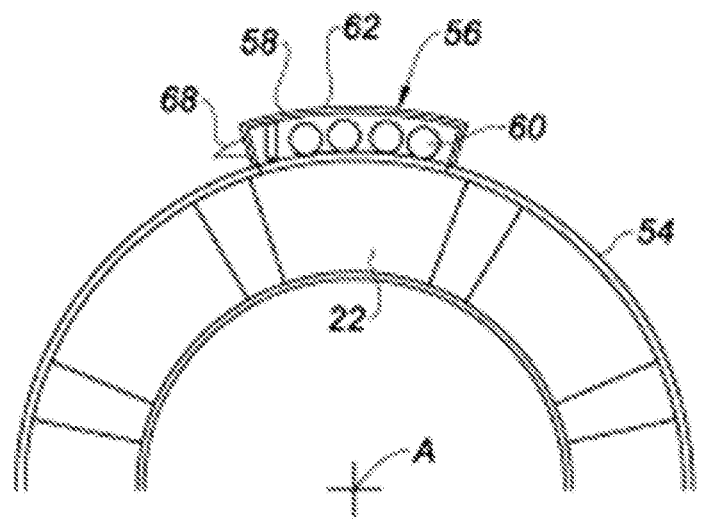
FIG. 5 is a very schematic, cross-sectional half-view of the turbomachine through the plane 5-5 of FIG. 3.
Figure 6:
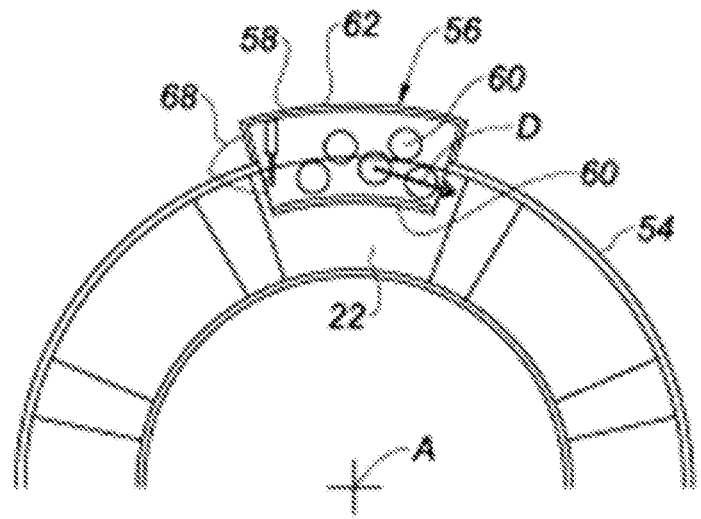
FIG. 6 is a very schematic, cross-sectional half-view of the turbomachine through the plane 6-6 of FIG. 4.

It is advantageous that the flap 66 remains open while the projectiles 60 do not exit the housing 62. It is therefore provided that the projection means 58 comprise a spring 68 for assisting with and holding the opening of the flap 66. Such a spring 68 has been shown schematically in FIGS. 5 and 6, between a compressed position associated with the closing of the flap 66, as shown in FIG. 5, and a partially decompressed position as shown in FIG. 6. In the latter position, the spring 68 is tared so as to remain partially compressed such that the flow of pressurized gases circulating in the flow path 22 cannot close the flap 66 again.

In a variant, or in addition to the spring 68, the flap 66 can comprise a profile or an aerodynamic appendage (not shown) enabling favoring the opening thereof and the holding thereof in an open position.

In this embodiment, the projectiles 60 are provided to be driven simply by the flow of gases crossing the bypass 22.

However, it is also possible to provide means for propelling (not shown) the projectiles 60 outside of the housing 62. These means enable avoiding certain projectiles 60 being repelled by the pressure of the gases in the housing 62. These means can, in addition, enable to assist the opening of the flap 66. Finally, they enable to give the projectiles 60 an increased kinetic energy, which is intended to be released during the impact of the projectiles 60 with the blades of the LP turbine 44.

Figure 7:
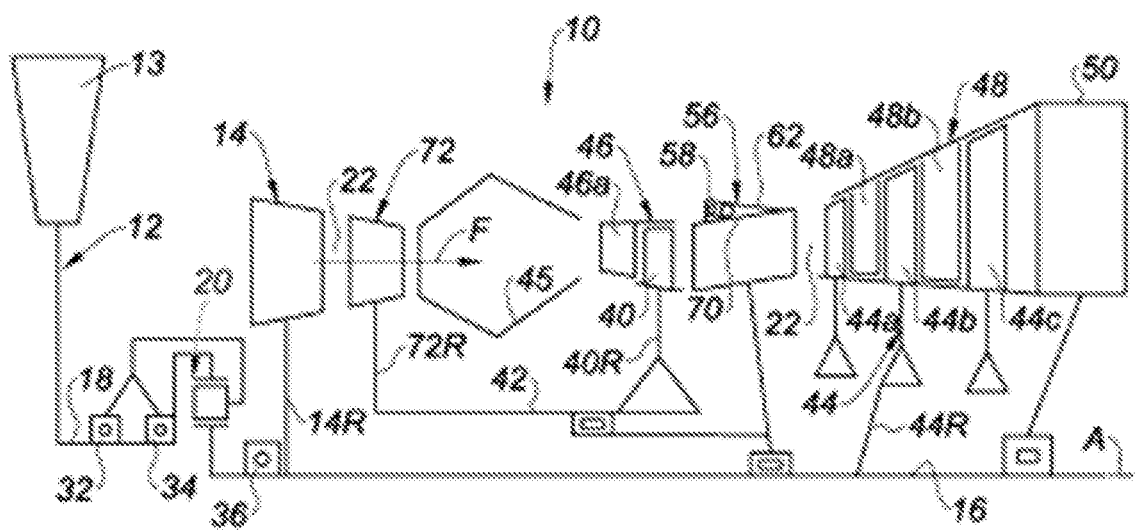
FIG. 7 is a very schematic, cross-sectional, longitudinal half-view of a turbomachine according to the disclosure, equipped with a device for limiting overspeeding according to a second embodiment of the disclosure shown in an inactive mode.

According to a second embodiment of the disclosure which has been shown in FIGS. 7 and 8, the housing 62 is coupled with a wall part 70 of the casing 54 and does not lead into the flow path 22. The wall part 70 is configured to be crossed by the projectiles 60 as soon as at least one first of these projectiles 60 is propelled against the wall part 70 at a determined speed. To this end, the wall part 70 can be designed in the same material as the casing 54 with a determined thickness and/or with breaking points (not shown) which enable the tearing thereof at least by the first of the projectiles 60, as shown in FIG. 8. In a variant, the wall part 70 could be constituted of a cover made of a material, different from the material of the casing 54, such as a resin or a mastic, resistant to the functioning temperatures of the turbomachine, and specific to be perforated by at least one projectile 60.

The projection means 58 to this end comprise means for propelling projectiles 60 outside of the housing 62, able of giving them an energy sufficient to cross the wall 70. For example, these can be pyrotechnic means. For example, these pyrotechnic means can, similarly to those which could be used for the opening of the flap 66, consist of an explosive charge or possible sodium acid pellets or another material that generates gas.

In the preferred embodiment of the disclosure, the projection means 58 are configured to orient the free projectiles along a direction D, tangential to the first blade stage, this direction forming an angle of at most 90° with the axis of rotation of the turbine 44. Any known means from the state of the art, like a rail for guiding the projectiles 60 into the housing 62 can suit the implementation of this characteristic.

In a third embodiment of the disclosure (not shown), the at least one projectile can comprise a wall part of the casing 54. For example, the projection means 58 can provide pyrotechnic means enabling, directly or indirectly, the ejection of a part of the wall of the casing 54 in the bypass. It is thus possible to provide that a part of the wall of the casing 54 comprises breaking point zones with the remainder of the casing 54, these breaking point zones being configured to break in response to a pyrotechnic application of this part of the casing 54.

This third embodiment can be considered by itself or combined with either of the first and second embodiments of the disclosure. For example, it is possible to provide, that in the first embodiment of the disclosure, the projection means 58 enable the ejection of the flap 66 inside the bypass 22. In a variant, it is possible that, in the second embodiment of the disclosure, the projectiles 60, when they are propelled outside of the housing 62, are provided to remove with them a part of the wall 70 provided to be separated from the casing 54.

It will be understood, in all embodiments of the disclosure, that each projectile 60 has characteristics of mass, dimension, hardness, and shape, capable of enabling a release of energy during the impact thereof with the blades of the stages 44a, 44b, 44c, which is sufficient to cause the breaking of the blades. For example, it is possible to design projectiles 60 comprising specific spherical, or on the contrary, angular shapes, capable of favoring the breaking of the blades of the stages 44a, 44b, 44c.

In these configurations, the method for controlling a device for limiting overspeeding of the turbine shaft 16 comprises at least one first step of monitoring the speed of the shaft 16 of the turbine 44. Then, if necessary, the method comprises a second step of detecting overspeeding of the turbine 44, if the speed of the turbine 44 exceeds a determined overspeeding threshold.

The first step of monitoring the speed of the turbine 44 can also consist of a step of comparing the speed of the shaft 18 of the fan 12 to that of the LP shaft 16, by considering the reduction ratio of the reduction gear 20. Thus, an overspeeding can be considered as detected during the second step, if a speed difference is detected during the first step between the LP turbine 44 and the fan 12, given the reduction ratio of the reduction gear.

Then, in response to the triggering of this detection step, the method comprises a projection third step, during which the projection means 58 cause the release and/or the projection of the free projectiles 60 in the bypass 22. The free projectiles 60 cause the breaking of the blades of the stage 44a and the projectiles 60 accompanied by blade debris cause the destruction of all the stages 44b, 44c situated downstream, until the total destruction of the blades of the LP turbine 44.

Although the disclosure has been defined in relation to a specific type of turbomachine, it will be understood that it could be applied to any other type of turbomachine.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A device for limiting overspeeding of a turbine shaft of a turbomachine, comprising:
    destruction means for destroying rotor blades of at least one stage of the turbomachine, said rotor blades associated with the turbine shaft, said destruction means comprising projection means that are capable of projecting at least one projectile into a path of the rotor blades of said at least one stage, said projection means being mounted on a casing of the turbomachine, wherein the projection means is mounted on said casing upstream of said at least one stage of the turbomachine and is configured to release said at least one projectile in response to detection of overspeeding of the turbomachine and to project said at least one projectile in a free manner into the rotor blades of said at least one stage in order to cause the destruction of said at least one stage.

2. The device according to claim 1, wherein the projection means are mounted upstream of at least two stages of the turbomachine such that said at least one projectile and blade debris of at least one upstream stage causes the destruction of at least one downstream stage.

3. The device according to claim 2, wherein said casing is an inter-turbine casing arranged between two consecutive high-pressure, low-pressure and/or intermediate turbine casings of said turbomachine, and arranged upstream of all the stages of the low-pressure turbine of the turbomachine.

4. The device according to claim 1, wherein the projection means comprise a housing of a casing of the turbomachine which delimits a section of a flow path crossing the turbomachine, said housing further being sealed with respect to the remainder of the turbomachine, the projection means being configured to release said at least one free projectile in the flow path from said housing.

5. The device according to claim 4, wherein the housing leads to the flow path by way of an opening and wherein the projection means comprise a controlled flap blocking the opening of the housing, said flap being mobile between a sealed closed position wherein said flap holds said at least one projectile in the housing, and an open position in response to the detection of an overspeeding of the turbomachine, wherein said flap enables the release of said at least one projectile in order to enable said at least one projectile to be driven into the flow path.

6. The device according to claim 5, wherein the projection means comprise a pyrotechnic, electrical or hydraulic device for opening the flap.

7. The device according to claim 1, wherein the housing is coupled with a wall part of the casing and does not lead to a flow path, and wherein said wall part is configured to be crossed by said at least one projectile as soon as said at least one projectile is propelled against said wall part at a determined speed.

8. The device according to claim 1, wherein the projection means comprise means for propelling said at least one projectile outside of the housing.

9. The device according to claim 1, wherein the at least one projectile comprises a wall part of the casing.

10. A method for controlling the device for limiting overspeeding of a turbine shaft carrying the rotor blades of the turbomachine according to claim 1, comprising:
    monitoring the speed of the turbine shaft of the turbomachine;
    detecting overspeeding of the turbine shaft occurring if the speed of said turbine shaft exceeds a determined overspeeding threshold; and
    in response to detection of said overspeeding of the turbine shaft occurring,
    providing at least one free projectile in a flow path, the flow path crossing the rotor blades and delimited by the casing of the turbomachine.

11. A turbomachine, comprising:
    at least one stage of a turbine, the at least one stage having a number of rotor blades;
    a casing; and
    at least one projectile configured to be provided into a path of the number of rotor blades of said at of least one stage, said at least one projectile supported by the casing upstream of the at least one stage of the turbine, wherein said at least one projectile is released in a free manner in response to detection of overspeeding of the at least one stage of the turbine in order to cause the destruction of said at least one stage.

12. The turbomachine of claim 11, wherein the turbine is a low pressure turbine.

13. The turbomachine of claim 12, further comprising a housing that delimits a section of a gas flow path crossing the turbine, said housing further being sealed with respect to a remainder of the turbomachine, the housing configured to release said at least one projectile in the gas flow path from said housing.

14. The turbomachine of claim 13, wherein the housing leads to the gas flow path by way of an opening; and
    wherein the turbomachine further comprises a controlled flap blocking said opening, said controlled flap being movable to an open position to release said at least one projectile in the gas flow path.

15. The turbomachine of claim 13, wherein the number of rotor blades are located in the gas flow path.

16. The device according to claim 11, wherein the at least one projectile is supported upstream of at least two stages of the turbine such that said at least one projectile and blade debris of at least one upstream stage causes the destruction of at least one downstream stage.

17. The device according to claim 11, wherein said casing is an inter-turbine casing arranged between two consecutive turbine casings of said turbomachine selected from the group of casings consisting of one or more high-pressure casings, one or more low-pressure casing, and one or more intermediate turbine casings, said casing arranged upstream of all the stages of the low-pressure turbine of the turbomachine.

* * * * *